Patented Oct. 31, 1950

2,528,348

UNITED STATES PATENT OFFICE 2,528,348

NONFLAMMABLE HYDRAULIC FLUID

George H. Denison, Jr., San Rafael, Neal W. Furby, El Cerrito, and Robert O. Bolt, Richmond, Calif., assignors to California Research Corporation, San Francisco, Calif., a corporation of Delaware No Drawing. Application July 13, 1948, Serial No. 38,555

2 Claims. (Cl. 252—75)

The present invention relates to the preparation of hydraulic fluids, and more particularly to hydraulic fluid compositions of improved nonflammability characteristics.

Petroleum oils are extensively used in the preparation of hydraulic or power transmission fluids. These oils possess certain characteristics, such as good lubricating qualities and ability to protect metallic surfaces against rusting and corrosion, which make them desirable for use in hydraulic systems. However, an inherent disadvantage of petroleum oil hydraulic fluids is their ready flammability, a property which detracts from their usefulness.

Considerable effort has been expended in the search for a suitable hydraulic fluid resistant to fire, particularly for use in hydraulic systems of aircraft machines. Strong evidence indicating that aircraft fires may be due to or, at least, aggravated by, the use of flammable fluids in aircraft hydraulic systems has been accumulated. It has been found, for example, that leakage of fluid from aircraft hydraulic systems may occur, the fluid accumulating in pockets or impregnating insulating material used in the chassis of the plane, thus creating serious fire hazards. It has also been observed that ruptured hydraulic lines carrying a flammable hydraulic fluid under pressure have added to the intensity and seriousness of aircraft fires by the spraying of combustible fluid thereinto or by burning with torchlike effect. In spite of precautions taken to prevent leakage of hydraulic fluid, the use of flammable hydraulic fluids represents a serious fire hazard and the most satisfactory expedient of overcoming the problem seems to be the development of nonflammable materials suitable for hydraulic use.

An object of the invention is to prepare hydraulic fluid compositions having superior fire-retarding characteristics.

Another object of the invention is to prepare a hydraulic fluid having superior nonflammability characteristics suitable for use in aircraft hydraulic systems.

A further object of the invention is to prepare hydraulic fluids retaining substantially the advantages of a petroleum oil base fluid, but of materially decreased flammability.

Other objects and advantages of the invention will be apparent from the following description of the invention.

The present invention is predicated on the discovery that certain halogenated aliphatic olefins, for example, hexachlorobutadiene; refined petroleum oils, such as white oil; and an oil-soluble basic substance, hereinafter more fully described, capable of stabilizing the combination of the aforesaid ingredients against corrosion, may be combined to form a noncorrosive composition or mixture having superior nonflammability characteristics.

To the combination of the aforesaid ingredients we may add other components or ingredients to effect a final composition having properties which adapt the composition for particular uses or applications. For example, in addition to the property of nonflammability and the properties hereinabove indicated, it is desirable that in highly specialized uses, such as in aircraft use, the hydraulic medium be fluid at the low temperatures encountered in operation. Moreover, it is important that hydraulic fluids for use in aircraft exhibit good shear characteristics, that is, that they retain body and viscosity when subjected to the shearing action of hydraulic pumps and when passing through small openings or orifices at high pressure.

In our co-pending application, filed July 13, 1948 Serial No. 38,554, nonflammable hydraulic fluid compositions having excellent properties of nonflammability have been described and claimed. The compositions disclosed in the aforesaid application, however, suffer a disadvantage when compared with the hereindescribed fluids. Because of the lack of the petroleum oil component in those fluids, swelling or softening of sealing or packing material employed in hydraulic systems, particularly those of aircraft machines, is less readily prevented. The fluids described in the present application overcome the disadvantages of swelling or softening of packing materials, and are particularly useful for aircraft application.

More particularly, the chlorinated materials contemplated by the present invention are normally liquid aliphatic compounds or mixtures thereof preferably containing an amount of chlorine at least chemically equivalent to the amount of hydrogen, that is, at least as many chlorine atoms as hydrogen atoms or having the hydrogen completely substituted by chlorine. These chlorinated materials or compounds are further characterized by the fact that the chlorine atoms are attached to unsaturated carbon atoms, whereby high stability is obtained and the tendency of corrosive hydrogen chloride to split out is minimized. Compounds falling within the foregoing definition have been found susceptible to stabilization against corrosion, although present in the composition in large amounts.

In general, the chlorinated aliphatic materials, containing at least as many chlorine atoms as hydrogen atoms, contemplated by the present invention, may be represented by the formula R—CCl=CCl—R$_1$, wherein C and Cl represent or stand for carbon and chlorine, respectively; R represents chlorine, hydrogen or an alkyl group; and R$_1$ represents chlorine or a chlorine-substituted aliphatic group with the halogen atoms attached to vinylene (—C=C—) carbon atoms, the vinylene carbon atoms holding at least one chlorine atom each.

Specific examples of normally liquid chlorinated olefins useful for purposes of the present invention are hexachloro-1,3-butadiene, trichloroethylene, tetrachloroethylene, octachloro-1,3,5-hexatriene, 1,1,2 - trichloropropene, 1,1,2,3,4-pentachloro-1,3-butadiene, 1,1,2,3,4-pentachloro-1,3 - pentadiene, 1,2,3,4 - tetrachloro-1,3 - pentadiene, 1,1,2,3,4-pentachloro-1,3-hexadiene.

The oil-soluble basic materials found suitable in preventing or inhibiting the corrosive effects of the herein-contemplated combination of chlorinated olefin material and petroluem oil are oil-soluble reaction products of bases and weak organic acids. These oil-soluble basic materials may be represented by the formula M(YR)$_x$, wherein M is a metal falling within groups I to IV, inclusive, of the periodic table; Y is a non-metallic element taken from group VI of the periodic table, such as oxygen and sulfur; R is an organic radical, aliphatic or aromatic of preferably at least six carbon atoms; and $x$ is a numeral corresponding to the valence of metal M.

The anti-corrosion agents most advantageously employed in accordance with the present invention are alkaline earth metal phenates, such as magnesium phenates, strontium phenates, and calcium phenates, and are preferably formed from high molecular weight substituted phenols, the substituent groups being alkyl, aralkyl or cyclic non-benzenoid groups. A description of the aforesaid types of inhibitors and the preparation thereof is given in U. S. Patent No. 2,228,661, according to which patent, alkaline earth metal phenates of molecular weight greater than about 100 and containing more than ten carbon atoms and preferably sixteen or more carbon atoms are preferred.

Specific examples of anti-corrosion agents contemplated by the present invention include aliphatic derivatives, such as lithium, sodium, potassium, calcium, tin, aluminum, and magnesium octadecylate, calcium laurylate, magnesium cetylate, calcium dodecylate; calcium lauryl mercaptide, barium octadecyl mercaptide; and aromatic derivatives, such as barium cetylphenate, calcium cetylphenate, calcium diamylphenate, calcium p-tertiary-amylphenate, barium tertiary-amylphenate sulfide, magnesium tertiary-amylphenate sulfide.

It has been found that mixtures containing the herein contemplated chlorinated aliphatic material and petroleum oil may be effectively stabilized against corrosion by the above-mentioned anti-corrosion agents, although the chlorinated material is present in the composition in large amounts.

It has further been found, however, that the anti-corrosion agents are effective as stabilizing agents for the compositions when the petroleum oil component is refined petroleum oil. The presence in the compositions of petroleum oils of an insufficient degree of refinement prevents the anti-corrosion agents from exerting their stabilizing influence or materially impairs the effectiveness of such agents, thus causing the compositions to fail the specifications hereinafter described. Accordingly, we have found that petroleum oils having as a measure of refinement an aromatic carbon atom content below about 30 per cent, and preferably below 10 per cent, as determined by the Deansley-Carlton method, described in Industrial and Engineering Chemistry, 14, 220 (1942), are suitable in carrying out the present invention. The substitution of oils having an aromatic carbon content above about 30 per cent impairs stability and gives rise to corrosive compositions unsuitable for the purposes herein intended.

The petroleum oil of the present invention may be derived from refined solvent or acid treated hydrocarbon oils or mixtures thereof, obtained from various crudes, such as paraffinic, naphthenic or mixed base crude oils or from synthetic processes, such as in the manufacture of polymers of olefins. These oils may have varying physical properties, such as viscosity and boiling range, etc., the selection of the particular oil being governed by the characteristics desired in the final composition, as will hereinafter more fully appear.

The qualities or properties desired in a hydraulic fluid are defined by specifications which vary with the particular use or application to which the hydraulic fluid is desired to be put. For example, hydraulic fluids for use in hydraulic equipment of aircraft machines, sea-going ships, in fluid couplings and torque converters may generally have low pour points, while on the other hand low pour points are not particularly required in other hydraulic equipment, such as in presses and die casting machines. In some instances non-swelling of sealing, or packing materials employed in hydraulic systems, particularly of aircraft, is an important requirement while not so important in other cases. Other properties, such as viscosity, viscosity index, specific gravity, etc. may vary widely depending on the use of the hydraulic fluid. Particularly severe and exacting are the requirements or specifications of hydraulic fluids for use in aircraft machines. In general, hydraulic fluids contemplated by the present invention are useful wherever flammability of the fluid is an undesirable property, and may be adapted to meet increasingly exacting requirements of a given use.

One of the tests that may be employed for the evaluation of the flammability characteristics of hydraulic fluids is the so-called Autogeneous Ignition Temperature test, ("A. I. T."), A. S. T. M. Designation D286–30. According to this test, various amounts of samples of the test material are admitted from a pipette to a flask immersed in a solder bath and the minimum ignition temperature determined. While in certain applications, for example torque converters, a suitable minimum ignition temperature may be around 550° F., a minimum ignition temperature of about 750° F. is preferred for aircraft hydraulic systems.

Another test that may be performed on hydraulic fluids is the corrosion and oxidation stability test. This test is particularly useful in the evaluation of aircraft hydraulic fluids, and is described in Army-Navy Aeronautical Specification AN-O-366 and Federal Specification VV-L-791c, Method 530.8. In carrying out this test, 100 ml. of the test fluid and weighed strips approximately one inch square of copper (Specification QQ-C-501), low carbon steel (Specification AN-QQ-S-676), aluminum alloy (Specification QQ-A-355), magnesium alloy (Specification AN-M-30), and cadmium plated steel (Specification AN-P-61) are placed in a large pyrex test tube provided with a tightly fitting stopper and a water-cooled reflux condenser. The metals are arranged in such manner that magnesium touches aluminum and steel, but not copper.

The test tube with contents is placed in a thermostatically controlled bath maintained at a temperature of 250° F. Dry air is introduced into the test tube at a rate of approximately 5 liters per hour through a glass tube, one end of which has been drawn to an orifice having a diameter of $\frac{1}{16}$ inch and extending well to the bottom of the test tube. At the end of 168 hours, the oxidation is discontinued, and the weight change of the assembly noted. The oil is examined visually for separation of insoluble material or gumming and the viscosity and neutralization numbers of the oil are determined according to Section F of Specification AN-O-366. The metal specimens are washed in C. P. benzene, then in acetone, and then dried before reweighing. They are also examined for appearance and pitting or corrosion under a magnification of 20 diameters.

A further important test that may be performed on the hydraulic fluids herein contemplated is the Pour Point test, as described in A. S. T. M. Designation D97-47. The pour point of a fluid is the lowest temperature at which it will flow or pour when chilled under controlled conditions. The pour point will vary widely with the use of the fluid. Thus, in die casting machines which are ordinarily not subect to temperatures much below ordinary room temperatures of around 70° F., a low pour point is not particularly desired. On the other hand, operational temperatures of aircraft machines vary widely and may change abruptly, and it is desirable that aircraft hydraulic fluids have a pour point not above about −20° F. and preferably between the range of about −45° F. and about −70° F. and lower.

Specifications for viscosity vary widely depending on the use, and may vary widely even for a given use. A viscosity range of about 2 centistokes at 130° F. to 16 centistokes at 210° F. represents a range of general applicability. In arriving at the desired viscosity, blending methods well known in the art may be employed, and in compounding the compositions of the present invention refined petroleum oils having viscosities as low as about 3 centistokes at 100° F. and as high as about 55 centistokes at 210° F. may be employed. Given the viscosities of the component liquids of chlorinated olefin and petroleum oil at a given temperature, a blend of roughly the desired viscosity may be made up by consulting Standard Viscosity - Temperature Charts, A. S. T. M. Designation D341-43. Although the aforesaid charts are designed for use in the blending of two hydrocarbon oils of different viscosities at a given temperature, we have found that we may substitute the chlorinated olefin component for the lighter component hydrocarbon oil employed in preparing the blend in accordance with the charts. Viscosities of blends thus obtained give rough approximations of the values desired. The blends then may be altered in the direction indicated to yield the final product. In effecting the blend, the third essential ingredient, namely, the corrosion inhibitor, may be combined with either the petroleum oil or the chlorinated hydrocarbon components and the resulting mixture considered as one ingredient in making the final composition.

According to the above mentioned charts a straight line is drawn between the known viscosities of the two components plotted on the proper lines at points corresponding to the values on the viscosity scale. Points on the straight line drawn through the points of known viscosity of the components show viscosities at the given temperature of blends of the particular components, depending on the relative amounts of light and heavy components.

The following is given as an illustration of the relative proportions of the essential three ingredients of the herein contemplated compositions:

| Ingredient: | Parts by weight |
|---|---|
| Chlorinated olefin | 20-95 |
| Refined petroleum oil | 5-50 |
| Corrosion inhibitor | 0.1-20 |

Compositions made up within about the foregoing range of proportioned amounts of ingredients show viscosities between the range of about 2 centistokes at 100° F. and about 16 centistokes at 210° F.; an autogeneous ignition temperature between about 550° F. and 1100° F. and a maximum corrosion of about 0.2 mg. per square centimeter, these data being obtained from tests hereinabove described. By increasing the relative amount of chlorinated olefin material we may raise the autogeneous ignition temperature. Pour point may be decreased with the proper selection of the petroleum oil and chlorinated olefin material, for example, by the selection of low melting point chlorinated material and low viscosity oil.

As a more specific illustration of a suitable formulation of the three ingredients, the following examples are given:

*Example 1*

| Ingredients: | Per cent by weight |
|---|---|
| Medicinal white oil (350 S. S. U. at 100° F.) | 65 |
| Hexachlorobutadiene | 30 |
| Calcium cetylphenate | 5 |

The medicinal white oil used above was prepared from a suitable distillate fraction of a California naphthenic type crude by phenol treatment followed by exhaustive treatment with fuming sulfuric acid and finished by percolating through fuller's earth to obtain an oil substantially free of aromatic carbon atoms.

The foregoing composition was found to have the following properties: viscosity, about 11 centistokes at 130° F.; autogeneous ignition temperature, about 700° F.; corrosion, less than 0.1 mg. per square centimeter; and a pour point below about −20° F. This composition is of general utility and may be employed in the various applications hereinabove given, that is, in aircraft machines, on shipboard, in torque converters, die casting machines, presses, gun turrets or wherever flammability of the hydraulic fluid is deemed a handicap.

Example 2

| Ingredients: | Per cent by weight |
|---|---|
| Trichloroethylene | 37 |
| Calcium dodecylate | 5 |
| Refined naphthenic oil (32 centistokes at 210° F.) | 58 |

The petroleum oil component employed in Example 2 was prepared from a viscous distillate fraction obtained from California naphthenic crude by treatment with sulfuric acid of 87.5 per cent strength and finished by percolating through fuller's earth to an aromatic carbon atom content of about 15 per cent.

The foregoing composition had the following properties: Pour point, −45° F.; autogeneous ignition temperature (A. I. T.), 600° F.; viscosity, 6 centistokes at 130° F.

Example 3

| Ingredients: | Per cent by weight |
|---|---|
| Tetrachloroethylene | 45 |
| Barium octylnaphthylate | 8 |
| Refined paraffinic oil (185 S. S. U. at 210° F.) | 47 |

The paraffin oil above used was prepared by Duosol (propane and cresol) treatment of a California waxy residuum followed by dewaxing, distillation and contact clay treatment of the raffinate to produce a bright stock of about 8 per cent aromatic carbon atom content.

The following properties characterized the foregoing composition: Pour point, −10° F.; autogeneous ignition temperature (A. I. T.), 800° F.; viscosity, 14 centistokes at 130° F.

Example 4

| Ingredients: | Per cent by weight |
|---|---|
| Hexachlorobutadiene | 80 |
| Calcium dodecylphenate | 8 |
| Refined paraffinic oil (185 S. S. U. at 210° F.)[1] | 12 |

[1] The oil component is the same as in Example 3.

The above composition analyzed as follows: Pour point, −15° F.; autogeneous ignition temperature (A. I. T.), 1000° F.; viscosity, 3 centistokes at 130° F.

Example 5

| Ingredients: | Per cent by weight |
|---|---|
| Octachlorohexatriene | 65 |
| Calcium octyl phenate | 10 |
| Medicinal white oil (350 S. S. U. at 100° F.) | 25 |

The medicinal white oil component was as described in Example 1.

On analysis the foregoing composition showed these characteristics: Pour point, 0° F., autogeneous ignition temperature (A. I. T.), 800° F.; viscosity, 4 centistokes at 130° F.

To the compositions made up of the three ingredients hereinabove described we may impart further improved properties or increase those present in the desired direction to produce improved effects.

Thus, when it is desired to lower the pour point of the composition, such effect may be accomplished by the addition to the composition of a sufficient amount of a material capable of depressing or lowering the freezing point thereof, and in certain cases, such as with 1,2,4-trichlorobenzene and hexachlorobutadiene, forming a eutectic mixture.

Illustrative of freezing point depressing materials are certain halogenated aromatic hydrocarbons, such as certain chlorinated benzenes, e. g., monochloro-, dichloro-, trichloro-, tetrachloro- and pentachlorobenzenes, which have sharp melting points and are capable of forming eutectic mixtures with the chlorinated olefin material; chlorinated naphthalenes and biphenyls or mixtures thereof having no true melting points but solidifying to glass-like materials. In place of the chlorinated derivatives above mentioned, other halogenated derivatives such as brominated and fluorinated aromatic compounds may be advantageously employed. Other suitable substances which solidify to an amorphous glass-like form are alkaryl, diaryl, and alkaryl aryl ethers, having a molecular weight, for example, between about 100 and 400; and esters, such as dimethyl, diethyl, and dibutyl phthalate having molecular weights between about 200 and 500.

The presence in the composition of a freezing or pour point depressing substance in an amount of about 5 to 20 per cent has been found to effect a pour point of about −30° F. to about −70° F. and lower. The following composition was found to have a pour point of −65° F.:

| Ingredients: | Per cent by weight |
|---|---|
| Hexachlorobutadiene | 50 |
| Medicinal white oil (350 S. S. U. at 100° F.)[1] | 35 |
| Calcium cetylphenate | 5 |
| Chlorinated biphenyl (48% chlorine) | 10 |

[1] Prepared as described in Example 1.

Hydraulic fluids for use in aircraft hydraulic systems are desired to have good wear characteristics. Accordingly, a test, described under paragraph F-4g(1) of the Army-Navy Specification hereinabove mentioned, has been devised for the determination of the wear properties of hydraulic fluids for use in aircraft. According to this test, known as the Pumping Test, a number of samples of the fluid is run through a pump system a different number of cycles and any ill effects, such as weight loss, evidence of corrosion and scoring, on the various parts or loosening thereof are noted. The foregoing test is also useful for determining shear stability of the fluid. After the fluid is pumped for 5000 cycles under the conditions and in the apparatus described above, the viscosity change in centistokes at 130° F. and at −40° F. is determined. A satisfactory fluid exhibits a viscosity change not exceeding 35 per cent of that of the original oil.

We have found that the addition of an antiwear agent to the composition improves the wear characteristics thereof. Suitable anti-wear agents are simple, mixed or combined phosphate esters, that is, alkyl, aryl or alkaryl phosphates, soluble in the composition. Specific examples of phosphate esters are tricresyl phosphate, cresyl diphenyl phosphate, nonyl diphenyl phosphate, tributyl phosphate.

An amount of anti-wear agent ranging from about 0.1 per cent to about 5 per cent based on the composition has been found satisfactory. A preferred amount is not in excess of about 2 per cent.

In addition to improving the wear characteristics of the compositions herein contemplated, the phosphate esters may also serve to depress the freezing point of the composition, and in some cases they may be used alone to effect both a depression of the freezing point and to impart improved wear properties to the fluid.

In the event it is desired to improve the viscosity index of the hydraulic fluid compositions of the present invention, a viscosity index (V. I.) improver may be incorporated in the compositions. Any suitable lubricating oil viscosity index improver soluble in the composition may be employed. For example, the materials disclosed in U. S. Patent No. 2,091,627, namely, the oil-soluble polymerized esters of the acrylic acid or vinyl ester series of molecular weight between about 5,000 and 100,000 lower or higher have been found especially satisfactory for purposes of the present invention. Specific examples are the polymerization products of esters formed by the reaction of alpha-methacrylic acid with lauryl, cetyl and octadecyl alcohols. Polymers of butenes having molecular weights ranging from about 2,000 to 20,000 and which are soluble in the fluids at the low temperatures encountered in use are further examples of V. I. improvers. Satisfactory amounts of V. I. improvers in the compositions may range from as little as about 0.1 to as high as about 10 per cent and amounts in excess of about 10 per cent are less desirable as causing failure of the hydraulic fluid to pass the Pumping Test.

In the event it is desired to inhibit rusting of the fluid or prevent oxidation of the mineral oil component, we may add other ingredients to effect these results. For example, a detergent or wetting agent, that is, an alkali or alkaline earth metal organic sulfonate, such as sodium white oil sulfonate, sodium lauryl sulfonate, calcium octadecyl sulfonate, barium cetylbenzene sulfonate, may be added in amounts of about 0.1 per cent to 5 per cent to inhibit rusting. An amount between about 0.1 and 0.5 per cent of an anti-oxidant such as methyl-ditertiary-butyl-phenol or tertiary-butyl-catechol, based on 100 parts of the composition, has been found satisfactory to prevent oxidation of the petroleum oil component.

In general, compositions composed of the following ingredients present within about the following proportions by weight per cent have been found to meet most stringent requirements of a nonflammable hydraulic fluid:

| Ingredients: | Per cent by weight |
|---|---|
| Naphthenic medicinal white oil [1] | 5–50 |
| Chlorinated olefin | 20–85 |
| Corrosion inhibitor | 0.1–20 |
| Freezing point depressant | 5–20 |
| Anti-wear agent | 0.1–5 |
| Viscosity index improver | 0.1–10 |
| Rust inhibitor | 0.1–5 |

[1] Oil described in Example 1.

Compositions falling within the above limits may further be stabilized against oxidation by the addition to the finished composition of about 0.1 to about 1 per cent of a phenolic type anti-oxidant, based on 100 parts of the composition, such as methylditertiary-butylphenol.

As a specific example of a suitable nonflammable aircraft hydraulic fluid, the following is given, the ingredients being present in about the amounts indicated:

| Ingredients: | Per cent by weight |
|---|---|
| Hexachlorobutadiene | 48.9 |
| Medicinal white oil (350 S. S. U. at 100° F.) [1] | 33.9 |
| Calcium cetylphenate | 2.5 |
| Chlorinated biphenyl (48% Chlorine) | 9.8 |
| Lauryl methacrylate polymer (mol. wt. about 15,000) | 0.4 |
| Tricresyl phosphate | 2.0 |
| Sodium white oil sulfonate (derived from white oil of viscosity 100 S. S. U. at 130° F.) | 2.5 |
| | 100.0 |

[1] Prepared as described in Example 1.

To the above ingredients there was added about 0.4 per cent of the anti-oxidant, methylditertiary-butyl phenol.

The following inspections were obtained from the foregoing formulation:

Flash point, 0° F.—No true flash point
Specific gravity at 60° F./60° F., 1.245
Viscosity at 210° F. centistokes, 2.81
Viscosity at 130° F. centistokes, 7.05
Viscosity at 100° F. centistokes, 11.19
Viscosity at —40° F. centistokes, 5160
Viscosity index, 106
Pour point, 0° F., Below —70
Low temperature stability (6 days storage at —60° F.)—Remains fluid
Neutralization No.—Nil
Shear breakdown—Less than 10 per cent viscosity change

| Oxidation and corrosion (168 hrs. at 250° F.) | Appearance | Wt. loss, mg./sq. cm. |
|---|---|---|
| Bronze | Bright | 0.00 |
| Carbon steel | Bright | 0.00 |
| Magnesium alloy | Bright | 0.04 |
| Cadmium plated steel | Bright | 0.00 |
| Aluminum alloy | Bright | 0.01 |

Autogeneous ignition temperature, °F., 760.

Low temperature stability of the fluid above mentioned was determined by subjecting the fluid to the test described under paragraph E–7 of the Army-Navy Aeronautical Specification AN–O–366 hereinabove mentioned. According to this test, the test fluid is maintained at a temperature not above —65° F. for 72 hours. A satisfactory fluid does not gel, crystallize, solidify or show evidence of separation of insoluble material after being subjected to these conditions.

The manner of compounding the compositions herein described is not critical. Any suitable equipment capable of effecting intimate admixture of the ingredients may be employed. The ingredients may all be mixed at one time or mixed severally. We have found, however, that an advantageous method of preparing the compositions is to mix the ingredients in stages or all at one time, except the corrosion inhibitor for the chlorinated aliphatic material, which is preferably added to, and stirred in, a preformed mixture of all the other ingredients preferably maintained at an elevated temperature of about 175–275° F.

Obviously, many modifications and variations of the invention as hereinabove set forth may be made without departing from the spirit and scope thereof, and therefore only such limitations are to be imposed as are indicated in the appended claims.

We claim:

1. An aircraft hydraulic fluid composition having superior characteristics of nonflammability consisting essentially of about 20 to 85 parts by weight of a normally liquid chlorinated aliphatic olefin in which chlorine is present in an amount not less than the chemically equivalent amount of hydrogen, and the chlorine is attached to unsaturated carbon atoms; as a corrosion-inhibiting agent for said chlorinated aliphatic olefin, about 0.1 to 20 parts of an alkaline earth metal phenate of molecular weight greater than about 100, and soluble herein; as a freezing point depressing substance, about 5 to 20 parts of a material of the group consisting of chlorinated benzene, naphthalene, and biphenyl, and mixtures thereof; as a viscosity index improver, about 0.1 to 10 parts of an oil-soluble polymerized ester of acrylic acid; as a rust inhibitor, about 0.1 to 5 parts of sodium white oil sulfonate; and about 5 to 50 parts of a refined petroleum oil, having as a measure of refinement an aromatic carbon atom content of less than about 30 per cent; said composition having a viscosity between about 2 and 16 centistokes at 130° F., and an autogenous ignition temperature between about 550° F. and 1100° F.

2. A composition substantially as described in claim 1, wherein the chlorinated aliphatic olefin is hexachlorobutadiene.

GEORGE H. DENISON, Jr.
NEAL W. FURBY.
ROBERT O. BOLT.

REFERENCES CITED

The following references are of record in the file of this patent:

UNITED STATES PATENTS

| Number | Name | Date |
|---|---|---|
| 2,017,089 | Cox | Oct. 15, 1935 |
| 2,023,367 | Krekeler | Dec. 3, 1935 |
| 2,091,627 | Bruson | Aug. 31, 1937 |
| 2,102,638 | Moses | Dec. 21, 1937 |
| 2,102,825 | Woodhouse et al. | Dec. 21, 1937 |
| 2,175,877 | Clark | Oct. 10, 1939 |
| 2,228,661 | Gardiner et al. | Jan. 14, 1941 |
| 2,356,685 | Neely et al. | Aug. 22, 1944 |
| 2,379,792 | Donlan | July 3, 1945 |
| 2,413,170 | Clark | Dec. 24, 1946 |
| 2,423,927 | Burke et al. | July 15, 1947 |

FOREIGN PATENTS

| Number | Country | Date |
|---|---|---|
| 430,741 | Great Britain | June 20, 1935 |